United States Patent

Chong et al.

(10) Patent No.: US 12,244,803 B2
(45) Date of Patent: Mar. 4, 2025

(54) CHROMA TRANSFORM TYPE DETERMINATION

(71) Applicant: Google LLC, Mountain View, CA (US)

(72) Inventors: In Suk Chong, Mountain View, CA (US); Hui Su, Sunnyvale, CA (US); Aki Kuusela, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 35 days.

(21) Appl. No.: 18/273,666

(22) PCT Filed: Jan. 25, 2021

(86) PCT No.: PCT/US2021/014955
§ 371 (c)(1),
(2) Date: Jul. 21, 2023

(87) PCT Pub. No.: WO2022/159115
PCT Pub. Date: Jul. 28, 2022

(65) Prior Publication Data
US 2024/0089433 A1    Mar. 14, 2024

(51) Int. Cl.
*H04N 19/12* (2014.01)
*H04N 19/103* (2014.01)
(Continued)

(52) U.S. Cl.
CPC .......... *H04N 19/12* (2014.11); *H04N 19/103* (2014.11); *H04N 19/119* (2014.11);
(Continued)

(58) Field of Classification Search
CPC .... H04N 19/12; H04N 19/103; H04N 19/119; H04N 19/124; H04N 19/13;
(Continued)

(56) References Cited

U.S. PATENT DOCUMENTS

| 2015/0016512 | A1* | 1/2015 | Pu | H04N 19/147 |
| | | | | 375/240.03 |
| 2015/0373332 | A1* | 12/2015 | Kim | H04N 19/122 |
| | | | | 375/240.03 |
| 2016/0219290 | A1* | 7/2016 | Zhao | H04N 19/167 |
| 2020/0036985 | A1* | 1/2020 | Jang | H04N 19/186 |
| 2020/0084447 | A1* | 3/2020 | Zhao | H04N 19/60 |

(Continued)

FOREIGN PATENT DOCUMENTS

WO    2020/035829 A1    2/2020

OTHER PUBLICATIONS

Terihiko Suzuki et al, "Description of SDR and HDR video coding technology proposal by Sony", Joint Video Eeperts Team (JVET) of ISO/IEC JTC1 /SC 29/WG 11 and ITU-T SG 16 WP 3, 10th Meeting, San Diego, US, Apr. 10-20, 2018, 3 pgs.

(Continued)

*Primary Examiner* — Marnie A Matt
(74) *Attorney, Agent, or Firm* — Young Basile Hanlon & MacFarlane, P.C.

(57) ABSTRACT

For a coding block of an image, a luma prediction block is generated, a luma residual block is generated, a quantized luma block is generated after transforming the luma residual block using a luma transform type, and the quantized luma block is entropy encoded. A chroma prediction block is generated, a chroma residual block is generated, an initial chroma transform type for the chroma residual block is determined as the luma transform type, a quantized chroma block is generated using the chroma residual block transformed by a final chroma transform type, and the quantized chroma block is entropy encoded. When the initial chroma transform type is other than a default transform type, the final chroma transform type is the initial chroma transform type or the default transform type, and quantized coefficients (Continued)

of the quantized chroma block depend upon quantized coefficients of the quantized luma block.

19 Claims, 8 Drawing Sheets

(51) Int. Cl.
| | |
|---|---|
| *H04N 19/119* | (2014.01) |
| *H04N 19/124* | (2014.01) |
| *H04N 19/13* | (2014.01) |
| *H04N 19/172* | (2014.01) |
| *H04N 19/176* | (2014.01) |
| *H04N 19/186* | (2014.01) |
| *H04N 19/61* | (2014.01) |

(52) U.S. Cl.
CPC ........... *H04N 19/124* (2014.11); *H04N 19/13* (2014.11); *H04N 19/172* (2014.11); *H04N 19/176* (2014.11); *H04N 19/186* (2014.11); *H04N 19/61* (2014.11)

(58) Field of Classification Search
CPC .......................... H04N 19/172; H04N 19/176; H04N 19/186; H04N 19/61; H04N 19/134; H04N 19/18
USPC ...................................................... 375/240.03
See application file for complete search history.

(56) References Cited

U.S. PATENT DOCUMENTS

| | | | |
|---|---|---|---|
| 2020/0374516 A1* | 11/2020 | Heo .................. | H04N 19/44 |
| 2021/0076038 A1* | 3/2021 | Zhang ................ | H04N 19/122 |
| 2021/0329242 A1* | 10/2021 | Zhang ................ | H04N 19/172 |
| 2023/0137603 A1* | 5/2023 | Zhao .................. | H04N 19/18 |
| | | | 375/240.18 |

OTHER PUBLICATIONS

K Choi et al, "Adaptive Multiple Transform for Chroma", Joint Video Experts Team (JVET) of ISO/IEC JTC 1/SC 29/WG 11 and ITU-T SG 16 WP3, 10th Meeting, San Diego, US, Apr. 10-20, 2018, 79 pgs.

Jianle Chen et al, "Algorithm description forVersatile Video Coding and Test Model 11 (VTM 11)", Joint Video Experts Team (JVET) of ISO/IEC JTC 1/SC 29 and ITU-T SG 16, JVET Meeting, by teleconference, Oct. 7-16, 2020, 101 pgs.

International Search Report and Written Opinion of International Patent Application No. PCT/US2021/014955 dated Oct. 21, 2021, 18 pgs.

* cited by examiner

CHROMA TRANSFORM TYPE DETERMINATION

BACKGROUND

Digital images and video can be used, for example, on the internet, for remote business meetings via video conferencing, high definition video entertainment, video advertisements, or sharing of user-generated content. Due to the large amount of data involved in transferring and processing image and video data, high-performance compression may be advantageous for transmission and storage.

SUMMARY

This application relates to encoding and decoding of image data, video stream data, or both, for transmission or storage. Disclosed herein are aspects of systems, methods, and apparatuses for encoding and decoding where the chroma transform type for a chroma block may be determined at an encoder using various techniques, which are identified implicitly, explicitly, or both, to a decoder. A chroma block may be encoded such that the reconstructed chroma block is the same at the encoder and decoder, regardless of how the chroma transform type is determined.

An aspect of the teachings herein is a method that includes partitioning a current image to be encoded into multiple coding blocks. The method also includes, for a coding block of the multiple coding blocks of the current image, generating a luma prediction block for a luma coding block comprising luminance information of the coding block, generating a luma residual block as a difference between the luma coding block and the luma prediction block, generating a quantized luma block after transforming the luma residual block using a luma transform type, entropy encoding the quantized luma block into a bitstream, generating a chroma prediction block for a chroma coding block comprising chrominance information of the coding block, generating a chroma residual block as a difference between the chroma coding block and the chroma prediction block, determining an initial chroma transform type for the chroma residual block as the luma transform type, generating a quantized chroma block using the chroma residual block transformed by a final chroma transform type, and entropy encoding the quantized chroma block into the bitstream. When the initial chroma transform type is a transform type other than a default transform type, the final chroma transform type is the initial chroma transform type or the default transform type, and quantized coefficients of the quantized chroma block depend upon quantized coefficients of the quantized luma block.

Another aspect of the teachings herein is a method that includes receiving a bitstream including encoded coding blocks of a current image partitioned into multiple coding blocks. A coding block of the multiple coding blocks is encoded by the above method, The method receives the bitstream, and for an encoded coding block, entropy decodes the quantized luma block, generates a dequantized luma block by dequantizing the quantized luma block, generates the luma residual block by transforming the dequantized luma block using the luma transform type, generates a luma prediction block for the luma coding block, generates the luma coding block by adding the luma prediction block to the luma residual block, entropy decodes the quantized chroma block, generates a dequantized chroma block by dequantizing the quantized chroma block, determines a chroma transform type for the dequantized chroma block as the luma transform type, generates the chroma residual block by transforming the dequantized chroma block using the chroma transform type, generates a chroma prediction block for the chroma coding block, generates the chroma coding block by adding the chroma prediction block to the chroma residual block, and reconstructs the coding block by combining the luma coding block and the chroma coding block.

Another aspect of the teachings herein is an apparatus including a processor that performs either or both of the above methods.

Variations in these and other aspects will be described in additional detail hereafter.

BRIEF DESCRIPTION OF THE DRAWINGS

The description herein makes reference to the accompanying drawings wherein like reference numerals refer to like parts throughout the several views unless otherwise noted or otherwise clear from context.

DETAILED DESCRIPTION

Figure 1:
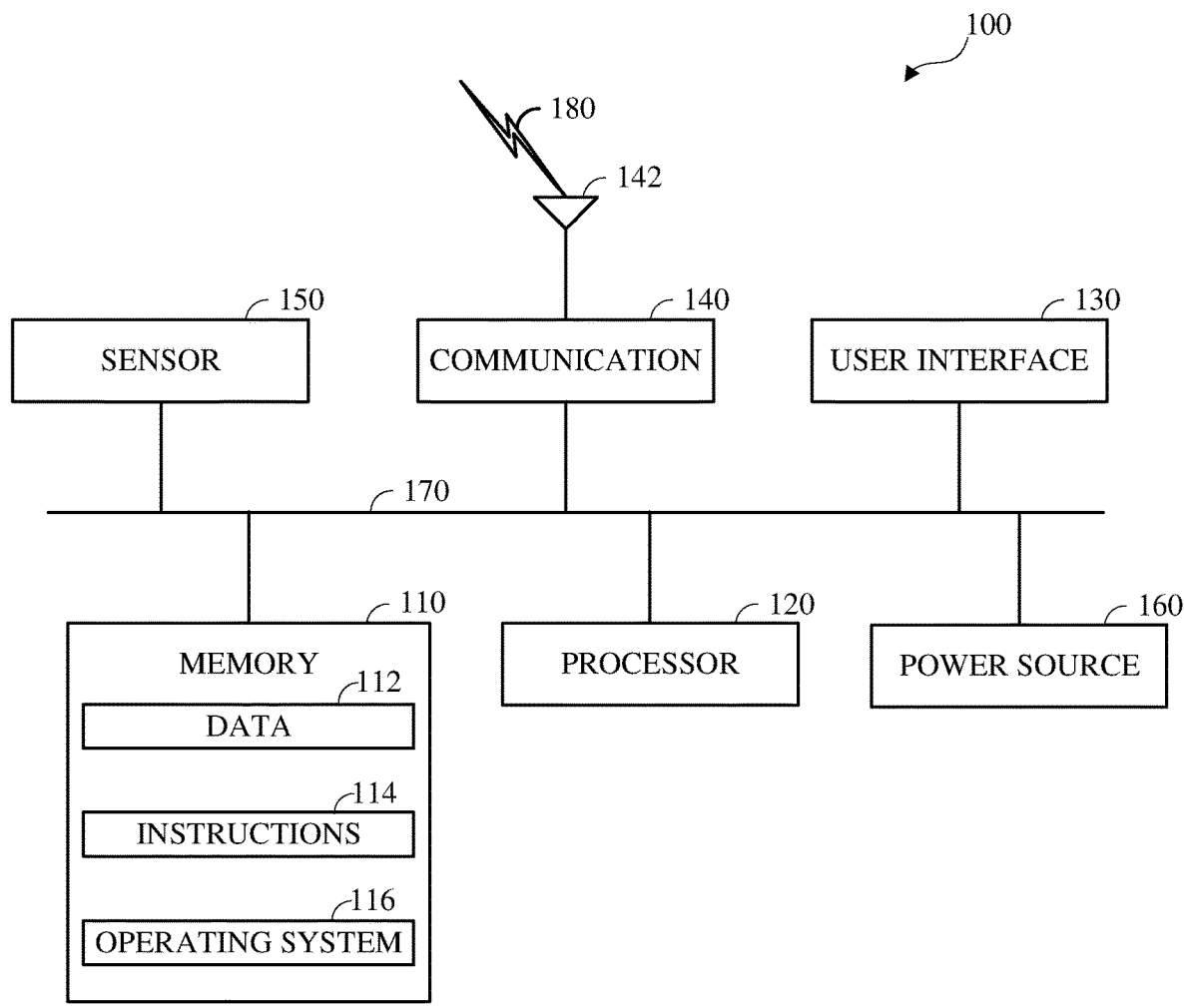
FIG. 1 is a diagram of a computing device in accordance with implementations of this disclosure.

Image and video compression schemes may include breaking an image, or frame, into smaller portions, such as blocks, and generating an output bitstream using techniques to minimize the bandwidth utilization of the information included for each block in the output. In some implementations, the information included for each block in the output may be limited by reducing spatial redundancy, reducing temporal redundancy, or a combination thereof. For example, temporal or spatial redundancies may be reduced by predicting a frame, or a portion thereof, based on information available to both the encoder and decoder, and including information representing a difference, or residual, between the predicted frame and the original frame in the encoded bitstream. The residual information may be further compressed by transforming the residual information into transform coefficients, quantizing the transform coefficients, and entropy coding the quantized transform coefficients. Other coding information, such as motion information, may be included in the encoded bitstream, which may include transmitting differential information based on predictions of the encoding information, which may be entropy coded to further reduce the corresponding bandwidth utilization. An encoded bitstream can be decoded to reconstruct the blocks and the source images from the limited information. In some implementations, the accuracy, efficiency, or both, of coding a block using either inter-prediction or intra-prediction may be limited.

Codecs that implement image or video compression generally code the color information separately, e.g., as first, second, and third planes of color information. For example, where the color information is divided into luminance information and chrominance information, including but not limited to YCbCr, YUV, or YU'V', the luminance information may be coded separately from the chrominance information. In some codecs one or more coding modes used for coding one color plane (e.g., the luminance information), such as the prediction mode or type used for reducing the temporal or spatial redundancies in the information or the transform mode or type used for transforming the related residual information, may be used for coding the other color planes (e.g., the chrominance information). In other codecs the one or more coding modes used for some of the color planes may be default modes or types that do not vary (e.g., for blocks) within an image or frame.

For example, a codec may require that the transform type for coding a plane of chrominance information of a block depend upon (i.e., is the same as) the transform type for coding a plane of luminance information of the block. Herein a plane of luminance information of a block may be referred to as a luma block, and a plane of chrominance information of a block may be referred to as a chroma block. In an encoder that determines that a luma block use other than a default transform type, the chroma block is also designated to use that transform type. After transformation and optionally quantization of the residual of the luma block, there may be no non-zero transform coefficients remaining. The transform type may then revert to the default transform type (e.g., the discrete cosine transform (DCT)), so that there is no need to separately signal the transform type for the current block. The decoder would then use the DCT for decoding each of the luma and chroma blocks of the current block. This may be a problem, however, because one or both chroma blocks may already be in an encoding pipeline using the original transform type by the time the decision is made for the luma block to revert to the default transform type. The chroma block would have to be re-encoded using the new transform type, using additional computing resources, slowing the encoding process, or both. Alternatively, the chroma block would be encoded using the original transform type, but the decoder would use the default transform type that the luma block is using.

The above is one example of how the dependency of a transform type for a plane of color information on that of another plane of color information can cause problems with some encoder architectures, in particular regarding certain hardware encoder architectures. More generally, such a dependency can reduce coding efficiency, such as increasing encoding time or the required processing resources, or by increasing the number of bits required to represent the chroma blocks as compared to the quality of the reconstructed chroma blocks. This can be due to the use of different transforms for encoding and decoding the chroma block, or requiring re-encoding of a chroma block, but can also result from forcing a less than optimal transform type to one or two planes of color data. According to the teachings herein, various techniques may be implemented that address these issues by allowing the dependency of the transform types for the different planes of color information to be mitigated or even eliminated if desired. Details of these techniques are described below after a description of the environment in which the techniques may be implemented.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and the processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, 100 the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
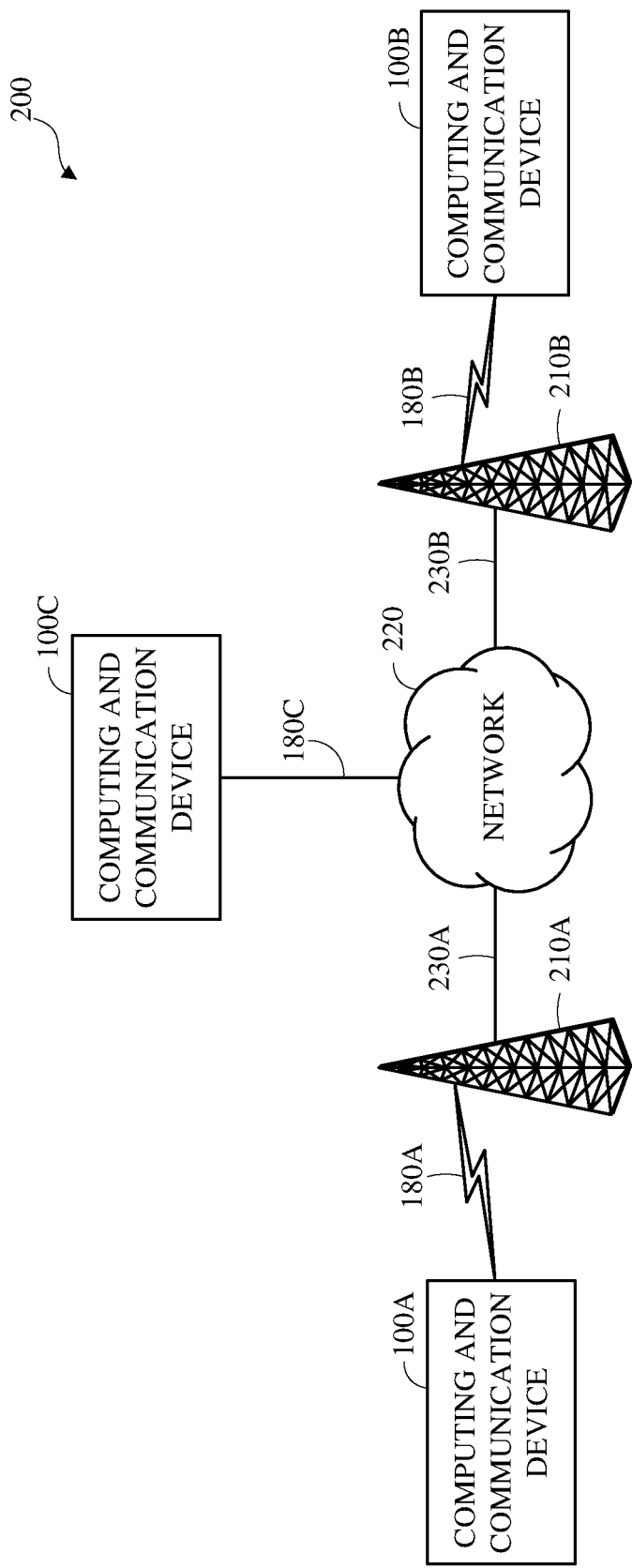
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
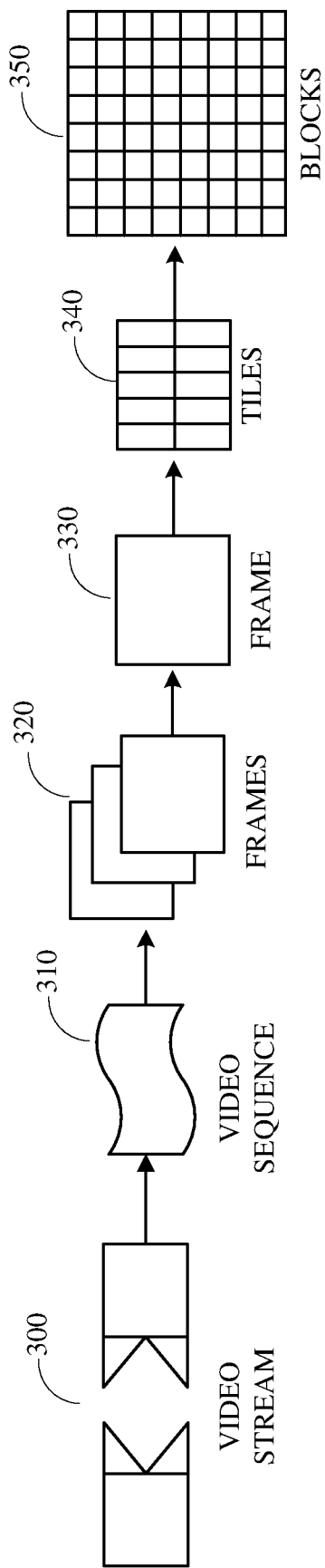
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include one or more tiles 340. Each of the tiles 340 may be a rectangular region of the frame that can be coded independently. Each of the tiles 340 may include respective blocks 350. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
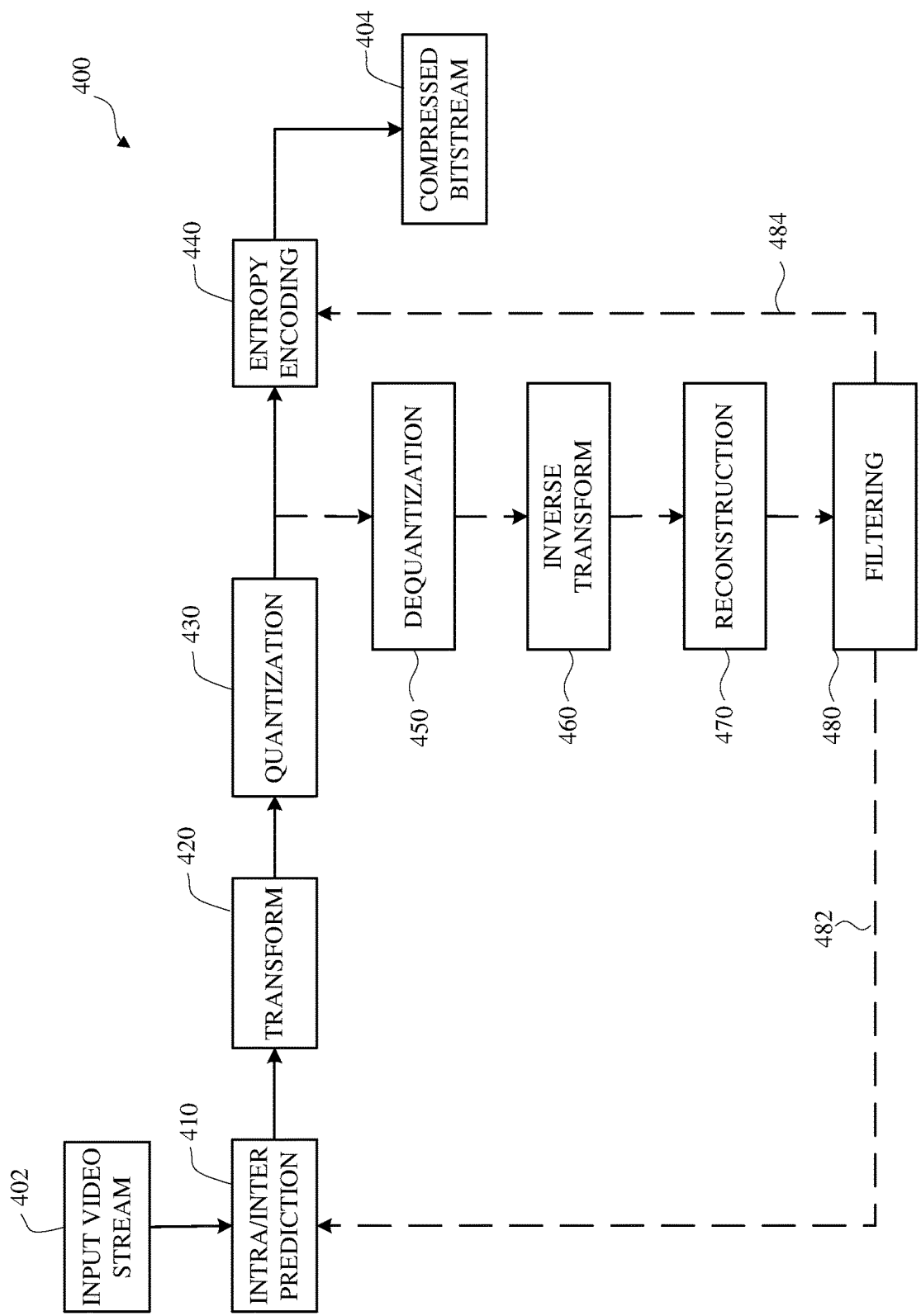
FIG. 4 is a block diagram of an encoder in accordance with implementations of this disclosure.

FIG. 4 is a block diagram of an encoder 400 in accordance with implementations of this disclosure. The encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in the computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
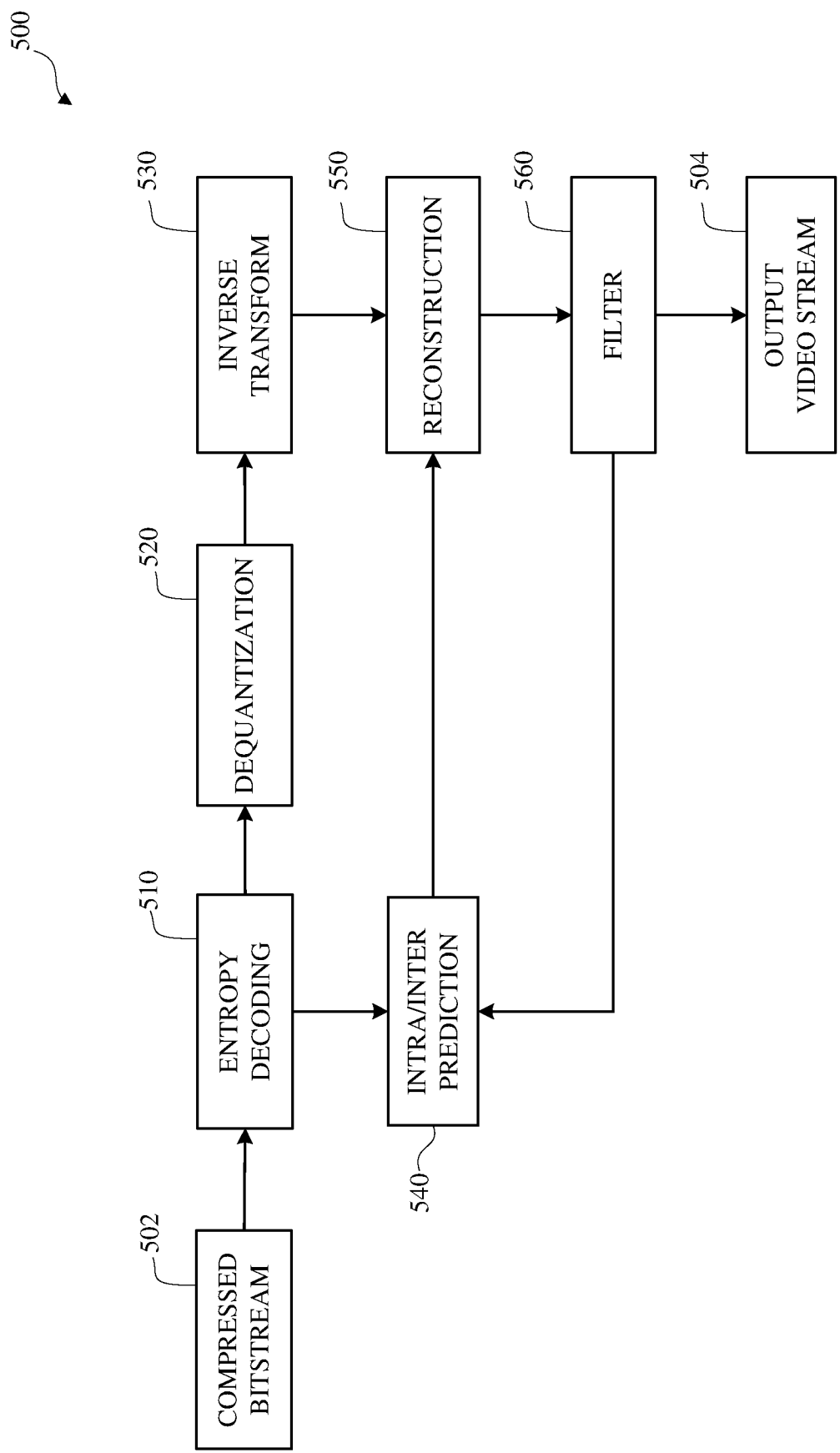
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform-based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without a deblocking filtering unit.

Figure 6:
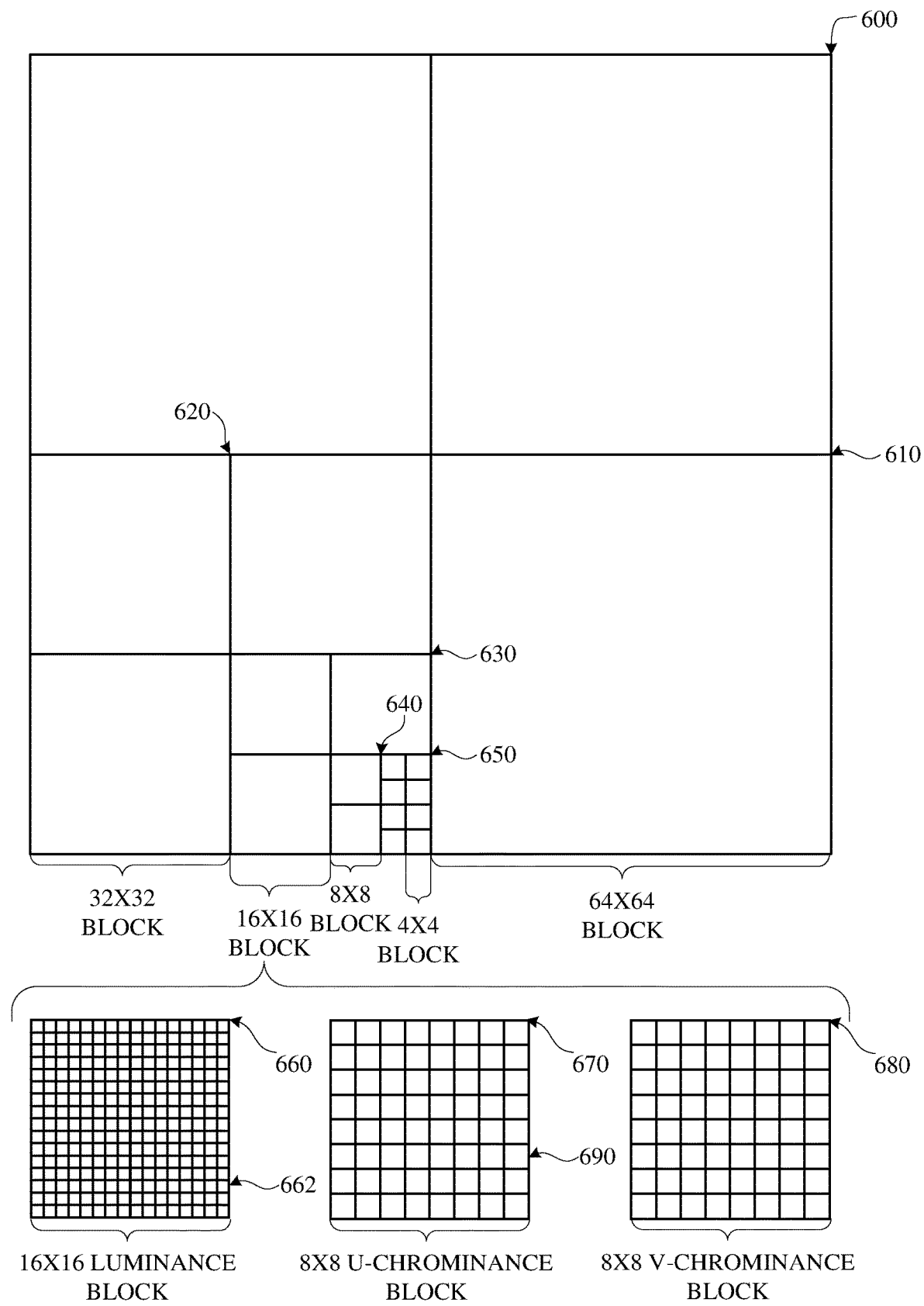
FIG. 6 is a block diagram of a representation of a portion of an image in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

Image or video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

Coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

Image or video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

Reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

Reducing spatial redundancy may include transforming a block into the frequency domain using, for example, the DCT or other transform types. For example, a unit of an encoder, such as the transform unit 420 shown in FIG. 4, may perform a DCT using transform coefficient values based on spatial frequency.

Reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location and reducing temporal redundancy may include generating motion information indicating the spatial difference, or translation, between the location of the block or pixel in the current frame and corresponding location of the block or pixel in the reference frame.

Reducing temporal redundancy may include identifying a portion of a reference frame that corresponds to a current block or pixel of a current frame. For example, a reference frame, or a portion of a reference frame, which may be stored in memory, may be searched to identify a portion for generating a prediction to use for encoding a current block or pixel of the current frame with maximal efficiency. The search may identify a portion of the reference frame for which the difference in pixel values between the current block and a prediction block generated based on the portion of the reference frame is minimized and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a prediction may include calculating a cost function, such as a sum of absolute differences (SAD), between the pixels of portions of the search area and the pixels of the current block.

The spatial difference between the location of the portion of the reference frame for generating a prediction in the reference frame and the current block in the current frame may be represented as a motion vector. The difference in pixel values between the prediction block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

Block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning includes a full prediction partition search, which may include selecting a prediction partitioning scheme by encoding the coding unit using each available candidate prediction partitioning scheme and selecting the best scheme, such as the scheme that produces the least rate-distortion error.

Encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

Image or video coding for a current block may include identifying an optimal prediction coding mode from multiple candidate prediction coding modes, which may provide flexibility in handling video signals with various statistical properties and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes is reduced by limiting the set of available candidate prediction coding modes based on similarities between the current block and a corresponding prediction block. The complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

Block-based coding efficiency may be improved by partitioning a current residual block into one or more transform partitions, which may be rectangular, including square, partitions for transform coding. Image or video coding using transform partitioning may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform or non-uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

Image or video coding using transform partitioning may include identifying multiple transform block sizes for a residual block using multiform transform partition coding. In some implementations, multiform transform partition coding includes recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. Determining whether to transform partition the current block may be based on comparing a cost for encoding the current block using a current block size transform to a sum of costs for encoding each partition using partition size transforms.

As initially described, the dependency of a transform type for a plane of color information (e.g., chrominance information in a chrominance or chroma block) on that of another plane of color information (e.g., luminance information in a luminance or luma block) can reduce coding efficiency. This is particularly true if this results in encoding and decoding a plane of color information (e.g., chrominance information) using different transform types.

Techniques described herein can mitigate or eliminate the issues raised by this dependency. Broadly stated, the techniques can modify the transform-type dependency of a color plane on another color plane by allowing the transform type to be separately identified, or by modifying the encoding process of one of the color planes where the transform-type dependency is used such that the reconstructed color information (e.g., a reconstructed chroma block) from the decoding process at an encoder is the same as that of a decoder, regardless of how the chroma transform type is selected.

A technique may be used that allows a transform type of a chroma block to be separately identified that optionally supports the dependency of the transform type of the chrominance or chroma block, such as one or both of the chrominance blocks 670, 680, on the transform type of the luminance or luma block, such as the luminance block 660. This may be achieved by using a chroma transform type mode for encoding a chroma block. The chroma transform type mode may be one of an available plurality of chroma transform type modes that respectively define how to determine the chroma transform type.

The available plurality of chroma transform type modes may include at least two modes. One of the available plurality of chroma transform type modes may include the mode described above where a chroma block of a coding block uses a transform type of a corresponding luma block of the coding block. The available plurality of chroma transform type modes can more generally include at least two of a Mode 1 where a chroma block of a coding block uses a default transform type, the Mode 2 where a chroma block of a coding block uses a transform type of a corresponding luma block of the coding block, a Mode 3 where a chroma block of a coding block uses one of a set of candidate transform types, regardless of a transform type of a corresponding luma block of the coding block, or a Mode 4 where a chroma block of a coding block uses a transform type that depends on a prediction mode used for prediction of the chroma block. A corresponding luma block is a luma block that belongs to the same coding block as the chroma block. The terms luma block and luma coding block, and the terms chroma block and chroma coding block, may be used interchangeably herein.

In this example, the default transform type may be the DCT, or another transform type. The default transform type may be a transform type that, when used, does not require separate signaling within the bitstream to be identified. The set of candidate transform types may be all available transform types, such as DCT, Asymmetrical Discrete Sine Transform (ADST), etc. The set of candidate transform types may be a subset of all available transform types, such as those used for adjacent choma blocks. Where a chroma transform type mode is used at the encoder, one or more bits may be included in the compressed bitstream identifying the chroma transform type mode so the decoder can identify the mode. The one or more bits (i.e., two bits where four modes are available) may be a flag that is sent in a header at a sequence level, a frame level, a tile level, or a block (e.g., superblock) level.

Each mode has its own advantages and disadvantages. Modes 1 and 4 are the simplest implementations at an encoder. However, they may not achieve the best coding efficiency because each eliminates all but one transform type as a choice for a chroma block. Mode 3 allows the chroma block to select an optimal transform type that leads to the best compression efficiency. To implement Mode 3, in an example, a rate-distortion loop may be used at the encoder that transforms a chroma block using each candidate transform type during an encoding process, reconstructs the chroma block, and determines the distortion in the reconstructed chroma block. The rate-distortion errors for encoding using the candidate transform types may be compared to select the transform type that minimizes the rate-distortion error. It is noted that Mode 3 may require the transmitting of an additional one or more bits identifying the chroma transform type from the set of candidate transform types, such as identifying an index of the chroma transform type within a list of the candidate transform types. This could be a flag transmitted in a header at the sequence level, the frame level, the tile level, or the block (e.g., superblock) level. In some implementations, one or more bits may be transmitted in the bitstream identifying the chroma transform type only if the chroma transform type is other than a default transform type.

Mode 2 has been found to provide a relatively good trade-off between complexity and coding performance. However, Mode 2 may be less useful for (e.g., hardware) encoders for the reasons previously described—that is, Mode 2 may result in a transform type for encoding a chroma block that is different from that used for decoding the chroma block. When a chroma block of a coding block uses a transform type of a corresponding luma block of the coding block, either as a standard feature of the codec or as a result of the selection of Mode 2 where a chroma transform type mode is signaled, modifying the encoding process can address this issue of possibly different transform types.

Multiple techniques may be used to modify the encoding process to address the issue of possibly conflicting transform types for a chroma block when the chroma block of a coding block is required to use a transform type of a corresponding luma block of the coding block. As mentioned above, this mismatch can occur when the luma block uses a non-default transform type (e.g., a non-DCT) to transform its residual block during encoding, but later changes to the default transform type (e.g., no non-zero coefficients exist in the transformed block, such as after quantization where quantization is performed).

As previously noted, frames are generally divided into non-overlapping blocks (e.g., superblocks) having a same size for the encoding process, such as the blocks 610. At least some of these blocks may then be partitioned into coding units or blocks, e.g., blocks that are separately predicted as described with regards to FIG. 6. A luma coding block, i.e., the luminance information of a coding block, may be predicted as described above with regards to FIG. 4. That is, a prediction block may be generated for the luma coding block, and a luma residual block may be generate as a difference between the luma coding block and the luma prediction block. That luma residual block may then be transformed and encoded into the bitstream (e.g., after quantization). In some implementations, the luma residual block may be partitioned into a plurality of luma transform blocks that are separately transformed using the same or different transform types.

A respective chroma coding block containing the chrominance information of the coding block is associated with a luma coding block. The transform type of a chroma coding block, when it depends on that of the luma coding block, adopts the single transform type of the luma coding block when the resulting luma residual block is not partitioned for transformation. When the resulting luma residual block is partitioned for transformation, any of the luma transforms may be used. Desirably, the first luma transform is used, i.e., the transform type of the first luma transform block of the coding unit or block in the coding order of the luma transform blocks, such as the coding order described with regards to FIG. 6.

Where the chroma transform type follows the first luma transform type within the coding block, one technique to address the dependency issue is to force the use of the default transform type (e.g., the DCT) for the first luma transform block within the coding block during encoding, even if a transform type other than the default transform type would result in better coding efficiency for the luma transform block. The chroma transform type would then be the default transform type such that the chroma transform block is encoded and decoded using the same transform type even when the first luma transform block has no non-zero coefficients after transformation. Forcing the use of the default transform type can include setting the luma transform type of the first luma transform block to the default transform type based on the position of the block within the coding block and without consideration of other available transform types. Although less desirable, forcing the use of the defaults transform type can include determining an initial luma transform type for the first luma transform block, along with the other luma transform blocks of the coding block, and then changing it to the default transform type as a final luma transform type before transformation. The final luma transform type (i.e., the default transform) would then be used for the corresponding chroma coding block.

Another technique may be to use the luma transform type as the chroma transform type, even where the luma transform type is other than the default transform type, while selectively modifying the chroma transform block depending upon the quantized coefficients of the (e.g., first) luma transform block after transformation. When the coefficients are all zero (i.e., there are no non-zero coefficients), all coefficients of the chroma transform block may be forced to zero. This may be done, for example, by storing the luma coefficients of the transformed luma transform block, such as in the quantization unit 430 of the encoder 400, and setting (e.g., through quantization) the coefficients of the chroma transform block after transformation to zero when none of the luma coefficients has a non-zero value and the chroma transform type is other than the default transform type. With all quantized coefficients being zero, the chroma transform type does not make any difference in its coding process. That is, the transform type in the encoding process may be a transform type other than the default transform type during encoding at the encoder, and the transform type in the decoding process at the decoder may be the default transform type process, but the reconstructed luma coding block is the same at each of the encoder and decoder.

Yet another technique could address the luma transform dependency issue using the stored luma coefficients. In particular, two transformations may be performed for the chroma coding block, e.g., at the transform unit 420, when the initial luma transform type, and hence the chroma transform type, is other than the default transform type. The chroma coding block may be transformed using the initial luma transform type into a first transformed chroma block and transformed into a second transformed chroma block using the default transform type. If there are no non-zero luma coefficients (i.e., the quantized coefficients are all zero), the second transformed chroma transform block may be encoded into the bitstream (e.g., by quantization and entropy coding). In contrast, if there are non-zero luma coefficients, the first transformed chroma transform block may be encoded into the bitstream (e.g., by quantization and entropy coding).

The techniques above may be used separately or together within an image. For example, a default condition of the codec may require all chroma coding blocks to use the luma transform type of a corresponding block. In these circumstances, the encoder may implement one or more of the techniques described above that modify the encoding process to eliminate any mismatch between the reconstructed luma block at the encoder and decoder. For example, one technique may be used for a block, a slice, some other portion of the image, or the entire image at the encoder. Another technique may be used for a block, a slice, or some other portion of the image at the encoder. One or more techniques may be used at an encoder for the current image, and when the current image is one of a sequence of images, such as frames 320 of a video sequence 310, the same or one or more different techniques may be used at the encoder for another image or frame of the sequence.

As opposed to a default decision with regards to the selection of a luma transform type, the decision with regards to the selection of a luma transform type may be made expressly using one or more of a luma transform type mode, such as one or more of Modes 1-4 described above. This would involve signaling of the luma transform type mode within the bitstream for an image, or portion of an image. One or more modes may be used at an encoder for the current image, and when the current image is one of a sequence of images, such as frames 320 of a video sequence 310, the same or one or more different modes may be used at the encoder for another image or frame of the sequence.

Where one of the modes for an image or portion of an image is the mode that requires all chroma coding blocks to use the luma transform type of a corresponding block (i.e., Mode 4 above), some implementations of an encoder may optionally implement one or more of the techniques described above that modify the encoding process to eliminate any mismatch between the reconstructed luma block at the encoder and decoder.

Further details of these techniques are described below starting with FIG. 7, which is a flowchart diagram of an example of a method 700 for encoding in accordance with implementations of this disclosure. The method 700 may be implemented in an encoder, such as the encoder 400 shown in FIG. 4. In certain examples below, image data of an image is described. This also encompasses the image data in individual frames of video data so may be referred to as video data in some examples.

Figure 7:
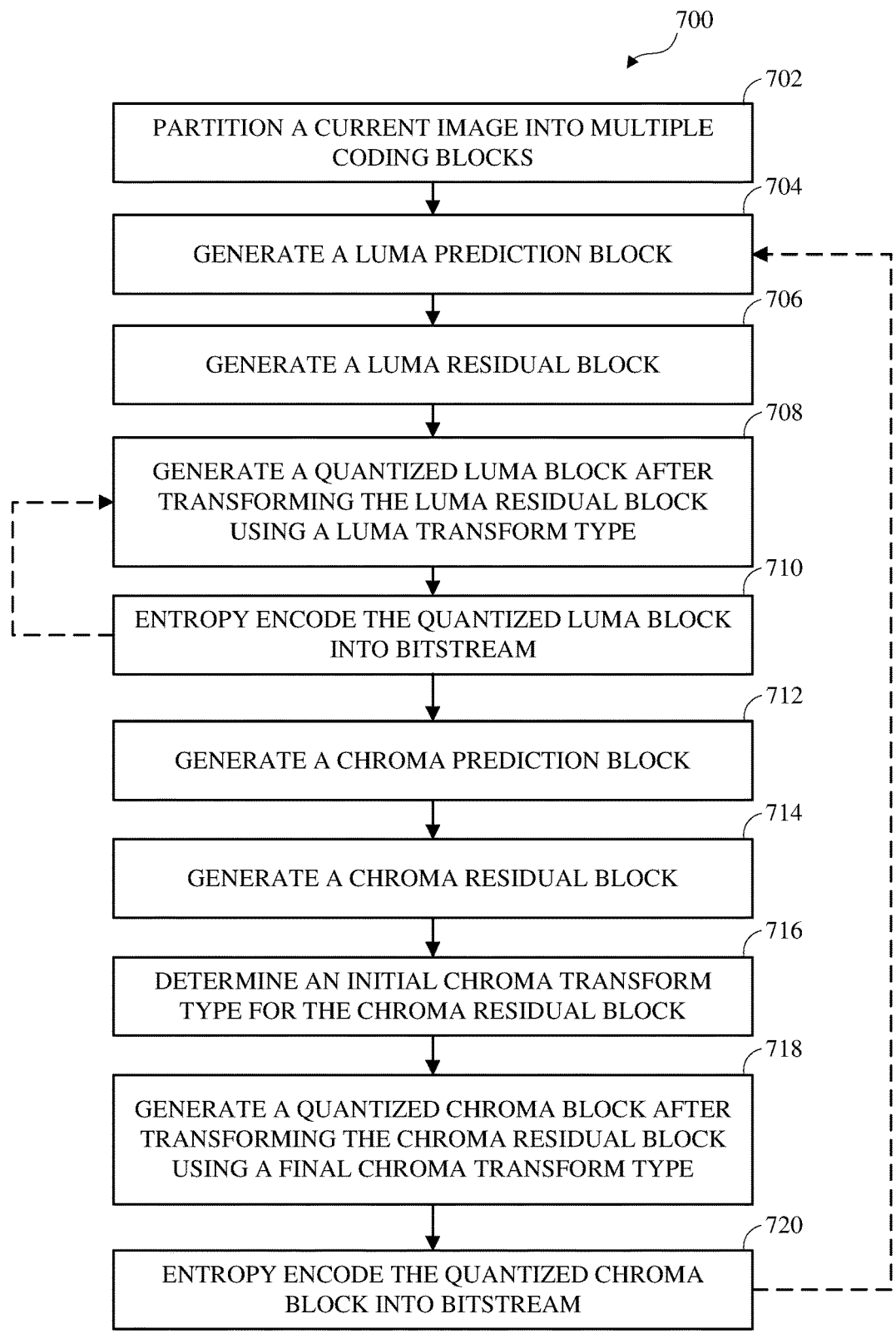
FIG. 7 is a flowchart diagram of an example of a method of encoding in accordance with implementations of this disclosure

As shown in FIG. 7, the method 700 may include partitioning a current image to be encoded into multiple coding blocks at 702. Examples of coding blocks may include blocks corresponding to the residual blocks 610, 620, 6330, 640, 650 shown in FIG. 6. Although not expressly shown in FIG. 7, the method 700 may include obtaining the current image, which may be an input image, such as a video frame 330.

At 704, the coding blocks begin to be processed in a coding order, such as in the coding order described with regards to FIG. 6. At 704, a luma prediction block is generated for a luma coding block comprising luminance information of a coding block. The luma prediction block may be generated by predicting the luma coding block using prediction as described above with regards to the intra/inter prediction unit 410. At 706, a luma residual block is generated as a difference between the luma coding block and the luma prediction block.

At 708, a quantized luma block is generated after transforming the luma transform block using a luma transform type. For example, the luma transform block may be transformed at the transform unit 420 of the encoder 400 using the luma transform type, and the transformed luma block (i.e., the transform coefficients of the transformed luma block) may be quantized at the quantization unit 430 of the encoder 400. The luma transform type may be an initial transform type that is the default transform type or is another transform type from a set of available transform types, such as those described above with regards to FIG. 4. In some implementations, the luma transform type may be selected to maximize compression of the luma transform block or to otherwise maximize coding efficiency (e.g., optimize a rate/distortion error). The luma transform type may be determined by any technique, such as testing different transform types within a rate-distortion loop. The luma transform type may be determined according to a set of rules, e.g., that depend upon characteristics of the luma transform block, such as determining the luma transform type based on what prediction mode was used for prediction, the size of the luma transform block, etc. The luma transform type may be forced to the default transform type in some implementations, according to the technique described above to eliminate reconstruction errors in the chroma coding block.

After transformation, such as at the transform unit 420 of the encoder 400, the generated quantized luma block is entropy encoded into a bitstream, such as the compressed bitstream 404. Entropy encoding the transformed luma block may occur at 410 at an entropy encoding unit of the encoder, such as at the entropy encoding unit 440. As shown by the arrow from 710 to 708, these steps may be repeated. For example, in some implementations, the luma transform block may be transformed in its entirety by the luma transform type (e.g., as separable one-dimensional transforms). In other implementations, the luma residual block may be partitioned into a plurality of luma transform blocks to be processed in a coding order of the plurality of luma transform blocks at 708 and 710. For example, a respective luma transform type for each of the plurality of luma transform blocks may be determined for generating a respective quantized luma block at 708, and entropy encoding the quantized luma block at 710 then includes entropy encoding each of the quantized luma blocks.

As is clear from this description, there may be only one luma transform type or there may be multiple luma transform types associated with a luma coding block. Where there are multiple luma transform types, the luma transform type determined for a first luma transform block of the coding block in a coding order of the plurality of luma transform blocks may be considered the luma transform type of the luma coding block for those implementations where the chroma transform type is required to use the luma transform type.

In some implementations where the chroma transform type is required to use the luma transform type, the luma transform type of the luma transform block may be determined without consideration of its effects on the chroma transform type to be the default transform type or a transform type other than the default transform type. Thereafter, when the luma transform type (e.g., an initial luma transform type) is a transform type other than the default transform type, the luma transform type may be changed to the default transform type (e.g., a final luma transform type) before transforming the luma transform block. In contrast to changing the luma transform type to the default transform type after transformation and quantization, this allows the chroma transform type to adopt the final luma transform type for quantization at the encoder instead of the initial luma transform type, thus preventing a mismatch between the coding processes during encoding and decoding of the chroma coding block or preventing the re-encoding of the chroma block at the encoder after the change in transform type.

In some implementations, and for some blocks, the luma transform type can be forced to the default transform type. This can reduce coding efficiency because the default transform type may be less efficient that an optimal transform type for the luma block. However, it eliminates any coding issues for chroma blocks that depend on the luma transform type. Due to the reduced efficiency of this technique, it may be more desirable to use this technique when a luma residual block is partitioned into luma transform blocks for transformation. Then, the luma transform type for a first luma transform block of a coding block in a coding order of the luma transform blocks may be determined as the default transform type. The chroma block can use this luma transform type. The other luma transform blocks can use the same or different luma transform types, desirably but not necessarily the transform type that minimizes the rate-distortion error. In some implementations, the use of the default transform type can occur even where a transform type other than the default transform type does or would increase coding efficiency of a luma block.

At 712, processing begins for the chroma coding block comprising chrominance information of the coding block. Although this method 700 is described with regards to one chroma coding block, by example, there are two chroma coding blocks associated with a luma coding block as noted above with regards to FIG. 6, Accordingly the steps of the method 700 associated with a chroma coding block may be applied, respectively, to each chroma coding block. Generally, the chroma coding blocks associated with a corresponding luma coding block use the same technique to determine the chroma transform type, and hence use the same chroma transform type, but this is not necessary.

At 712, a chroma prediction block is generated for the chroma coding block. The chroma prediction block may be generated by predicting the chroma coding block using prediction as described above with regards to the intra/inter prediction unit 410. At 714, a chroma residual block is generated as a difference between the chroma coding block and the chroma prediction block.

At 716, an initial chroma transform type is determine for the chroma residual block of the chroma coding block. In some implementations, the initial chroma transform type is determined according to chroma transform type mode, such as one of the modes described above. In some implementations, whether a chroma transform type mode is used or not use, the initial chroma transform type is determined as the luma transform type. In some implementations, the chroma transform type may be selected to maximize compression of the chroma transform block or to otherwise maximize coding efficiency (e.g., optimize a rate/distortion error). The chroma transform type may be determined by any technique, such as testing different transform types within a rate-distortion loop. The chroma transform type may be determined according to a set of rules, e.g., that depend upon characteristics of the chroma transform block, such as determining the chroma transform type based on what prediction mode was used for prediction, the size of the luma transform block, etc.

At 718, a quantized chroma block is generated after transforming the chroma residual block by a final chroma transform type. The initial chroma transform type may be the default transform type or a transform type that is other than the default transform type. When the initial chroma transform type is the default transform type, the final chroma transform type is the default transform type. When the initial luma transform type is a transform type other than the default transform type, the final luma transform type may be unchanged from the initial luma transform type when the luma transform type does not depend on the luma transform type (e.g., one of Modes, 1, 3, or 4 is used). When the initial luma transform type is a transform type other than the default transform type, the final luma transform type may be the initial chroma transform type or the default transform type.

Where the chroma transform type depends on the luma transform type, the final chroma transform type, the quantized coefficients of the quantized chroma block, or both, may depend upon quantized coefficients of the quantized luma block. For example, according to a technique described above, responsive to the quantized luma block having no non-zero coefficients and the initial chroma transform type being a transform type that is other than the default transform type, all quantized coefficients in the quantized chroma block are set to zero before encoding the quantized chroma block. In this situation, the initial chroma transform type is unchanged (the final chroma transform type is the initial chroma transform type) and is used to transform the luma residual block (e.g., at the transform unit 420 of the encoder 400). A quantization unit, such as the quantization unit 430 of the encoder 400, may store or otherwise access the quantized coefficients of the quantized luma block, and the transformed luma block (i.e., the transform coefficients of the transformed luma block) is quantized to zero when none of the quantized luma coefficients have a non-zero value. If there is at least one non-zero quantized coefficient of the quantized luma block, the initial luma transform type is also unchanged (the final chroma transform type is the initial chroma transform type), but the quantization unit, such as the quantization unit 430 of the encoder 400, quantizes the chroma residual block according to standard processing— with a quantizer or quantization parameter that may result in non-zero values for at least some of coefficients of the quantized chroma block.

For other coding block(s) of the current image, or where the current image is an other frame of a video sequence, for coding block(s) of the other frame, another technique may be used where the chroma transform type depends on the luma transform type that also relies upon the quantized coefficients of the quantized luma block. At 718, this could include transforming the chroma residual block using the default transform type to generate a first chroma transform block and transforming the chroma residual block using the initial chroma transform type to generate a second chroma transform block (e.g., where the initial chroma transform type is a transform type that is other than the default transform type). This could be performed at the transform unit 420 of the encoder 400. Thereafter, the first chroma transform block may be selected for generating the quantized luma block responsive to the quantized luma block having no non-zero coefficients, and otherwise, the second chroma transform block may be selected for generating the quantized luma block. As described above, this may be performed at a quantization unit, such as the quantization unit 430 of the encoder 400, after considering the coefficients of the quantized luma block that are either stored by or otherwise accessed by the quantization unit.

After the quantized chroma block is generated at 718, the quantized chroma block is entropy encoded into a bitstream at 720. The bitstream may be the compressed bitstream 404. Entropy encoding the transformed chroma block may occur at 720 at an entropy encoding unit of the encoder, such as at the entropy encoding unit 440.

As shown by the arrow from 720 to 704, these steps may be repeated for coding blocks of the current image. The method 700 may also be repeated for some or all of the coding blocks of another image where the current image is part of a sequence of images. As a result of the processing described above, for one or more coding blocks, the chroma transform type of a chroma coding block may differ at the encoder and decoder. Even in such a case, the chroma transform block when reconstructed is the same at both the encoder and decoder.

Figure 8:
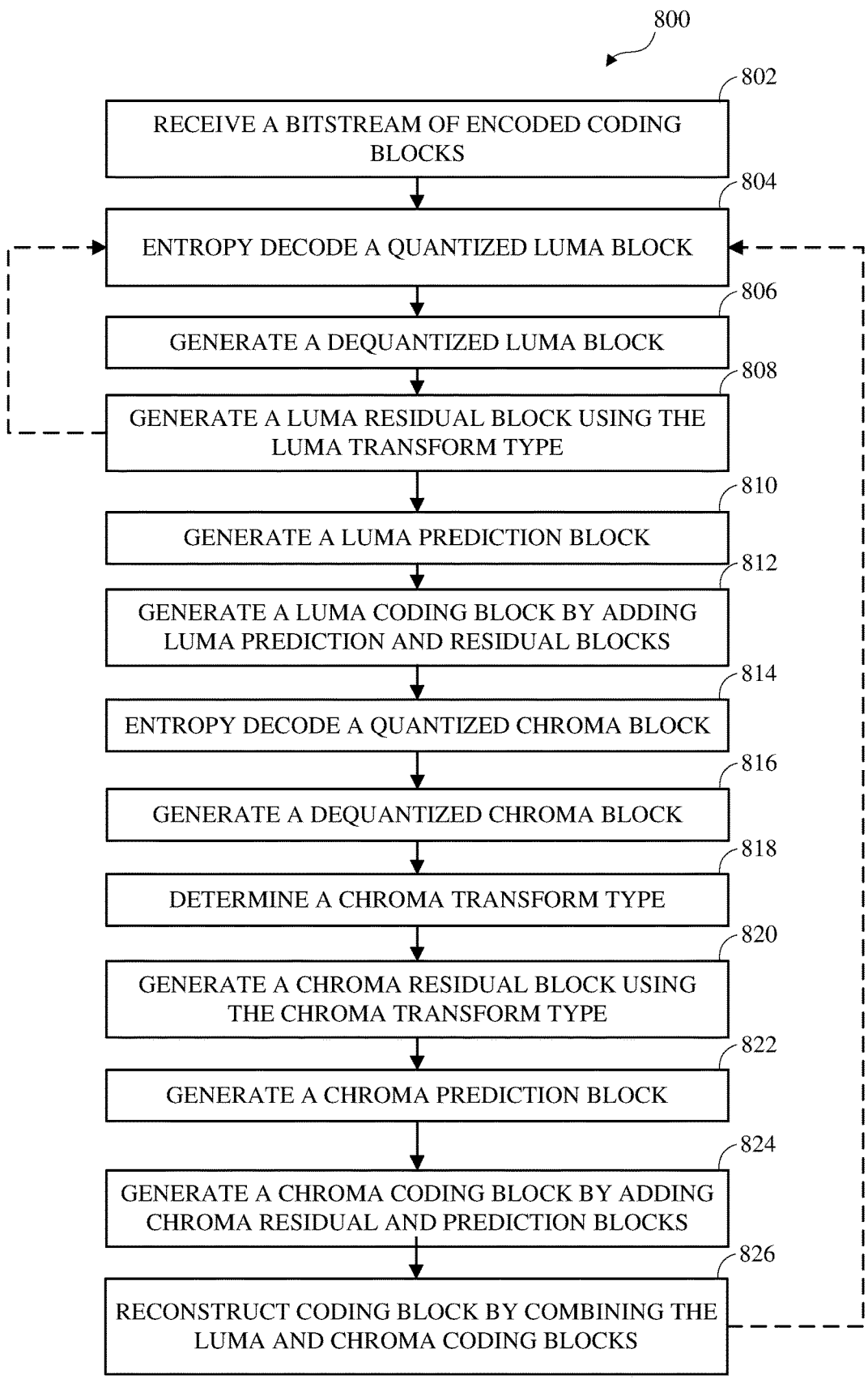
FIG. 8 is a flowchart diagram of an example of a method of decoding in accordance with implementations of this disclosure.

FIG. 8 is a flowchart diagram of an example of a method 800 of decoding in accordance with implementations of this disclosure. The method 800 may be implemented in a decoder, such as the decoder 500 shown in FIG. 5, or may be implemented in the reconstruction path of the encoder 400 shown in FIG. 4. The method 800 may be similar to the method 700 as shown in FIG. 7, except as is described herein or as is otherwise clear from context.

At 802, a bitstream, such as the compressed bitstream 502, is received at a decoder. The bitstream may be received via a wired or wireless electronic communication medium, such as the network 220 shown in FIG. 2, or reading from an electronic data storage medium, such as the memory 110 shown in FIG. 1. The bitstream includes a plurality of encoded coded blocks of a current image partitioned into multiple coding blocks. The coding blocks may be encoded according to the method 700 described above. In an implementation, at least one of the coding blocks is encoded as described with the variation that an initial chroma transform type for the chroma residual block is determined as the luma transform type, and a quantized chroma block is generated using the chroma residual block transformed by a final chroma transform type, wherein when the initial chroma transform type is a transform type other than a default transform type, the final chroma transform type is the initial chroma transform type or the default transform type, and quantized coefficients of the quantized chroma block depend upon quantized coefficients of the quantized luma block.

At 804, the processing of a luma transform block of a coding block begins by entropy decoding the quantized luma block. Entropy decoding may include entropy decoding the quantized transform coefficients of the quantized luma block (e.g., at the entropy decoding unit 510). At 806, a dequantized luma block is generated by dequantizing the quantized transform coefficients (e.g., at the dequantization unit 520).

At 808, a luma residual block is generated by transforming the dequantized luma block using the luma transform type. The luma transform type may be inferred as the default transform type when no bits are within the bitstream identifying the luma transform type. The luma transform type may be a transform type that is other than the default transform type. In some implementations, a header is decoded from the bitstream that includes bits identifying the luma transform type. The bits may identify a transform type from a set of available transform types as the luma transform type. Transforming the dequantized luma block may occur at an inverse transform unit, such as the inverse transform unit 530 of FIG. 5.

Steps 804, 806, and 808 may be repeated for each of a plurality of quantized luma blocks for a coding block encoded within the bitstream where the luma residual block was partitioned for transformation into a plurality of luma transform blocks during encoding. In such an implementation, the luma residual block is generated at 808 by combining the plurality of luma transform blocks after then are dequantized and inverse transformed.

At 810, a luma prediction block is generated for the luma coding block. Generating the luma prediction block at 811 may be done using the same prediction mode used to generate the luma prediction block in the method 700. This prediction may be performed by an intra/inter prediction unit of a decoder, such as the intra/inter prediction unit 540 of the decoder 500. The luma coding block may be generated or reconstructed by adding the luma prediction block to the luma residual block at 812.

At 814, a quantized chroma block of the coding block encoded within the bitstream is entropy decoded. Entropy decoding the quantized chroma block at 814 can include entropy decoding the quantized transform coefficients at the entropy decoding unit 510. Thereafter, at 816, the quantized transform coefficients of the quantized luma block are dequantized (e.g., at the dequantization unit 520).

At 818, the chroma transform type for the dequantized chroma block is determined. For at least one coding block, the final chroma transform type may be determined as the luma transform type. This may be a default setting of the decoder. In some implementations, determining the chroma transform type can include decoding, from the bitstream, one or more bits identifying a chroma transform type mode, wherein the chroma transform type mode is one of an available plurality of chroma transform type modes that respectively define how to determine the chroma transform type for at least one chroma transform block. Then, that chroma transform type mode may be used to determine the final chroma transform type. For example, Mode 2 provides that the chroma transform type is the luma transform type. Where the chroma transform type mode is a mode where a chroma coding block uses one of a set of candidate transform types, regardless of a transform type of a corresponding luma coding block, determining the chroma transform type can also include decoding, from the bitstream, an additional one or more bits identifying the chroma transform type. For example, where additional one or more bits may identify an index within a list of available transform types known to both the encoder and the decoder.

At 820, a chroma residual block is generated by transforming the dequantized chroma block using the chroma transform type at an inverse transform unit, such as the inverse transform unit 530. Because the chroma residual block for the chroma coding block that comprises chrominance information of the coding block is not partitioned in the example of FIG. 7, there are no further chroma coding blocks associated with the coding block to be decoded.

At 822, a chroma prediction block is generated for the chroma coding block. Generating the chroma prediction block at 820 may be done using the same prediction mode used to generate the chroma prediction block in the method 700. This prediction may be performed by an intra/inter prediction unit of a decoder, such as the intra/inter prediction unit 540. The chroma coding block may be generated or reconstructed by adding the chroma prediction block to the chroma residual block at 824.

At 826, the coding block may be reconstructed (e.g., at reconstruction unit 550) by combining the luma coding block and the chroma coding block.

The method 800 may be repeated for some or all coding blocks of the current image or coding blocks of another image in a sequence where the current image is part of the sequence.

As used herein, the term "set" indicates a distinguishable collection or grouping of zero or more distinct elements or members that may be represented as a one-dimensional array or vector, except as expressly described herein or otherwise clear from context.

The words "example", "implementation", or "aspect" and their variations are used herein to mean serving as an example, instance, or illustration. Any aspect or design so described is not necessarily to be construed as preferred or advantageous over other aspects or designs. Rather, use of these words is intended to present concepts in a concrete fashion. Moreover, use of the term "an embodiment" or "an implementation" or "an aspect" throughout is not intended to mean the same embodiment or implementation unless described as such.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. As used herein, the terms "determine", "identify", "generate", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

Further implementations are summarized in the following examples:

Example 1: A method comprising partitioning a current image to be encoded into multiple coding blocks; and for a coding block of the multiple coding blocks of the current image: generating a luma prediction block for a luma coding block comprising luminance information of the coding block; generating a luma residual block as a difference between the luma coding block and the luma prediction block; generating a quantized luma block after transforming the luma residual block using a luma transform type; entropy encoding the quantized luma block into a bitstream; generating a chroma prediction block for a chroma coding block comprising chrominance information of the coding block; generating a chroma residual block as a difference between the chroma coding block and the chroma prediction block; determining a chroma transform type for the chroma coding block according to a chroma transform type mode of an available plurality of chroma transform type modes that respectively define how to determine the chroma transform type, wherein the available plurality of chroma transform type modes comprises at least two of: a mode where a chroma coding block uses a default transform type; a mode where a chroma coding block uses a transform type of a corresponding luma coding block; a mode where a chroma coding block uses one of a set of candidate transform types, regardless of a transform type of a corresponding luma coding block; or a mode where a chroma coding block uses a transform type that depends on a prediction mode used for prediction of the chroma coding block; generating a quantized chroma block using the chroma residual block transformed by the chroma transform type; entropy encoding the quantized chroma block into the bitstream; and transmitting one or more bits in the bitstream identifying the chroma transform type mode.

Example 2: The method of Example 1, wherein the chroma transform type mode is the mode where a chroma coding block uses one of a set of candidate transform types, the method comprising: transmitting one or more bits in the bitstream identifying the chroma transform type within the set of candidate transform types.

Example 3: The method of Example 2, wherein the luma transform type comprises other than the default transform type, the method comprising: transmitting one or more bits in the bitstream identifying the luma transform type within the set of candidate transform types.

Example 4: The method of Example 2, wherein the luma transform type comprises other than the default transform type, the method comprising: transmitting one or more bits in the bitstream identifying the luma transform type within a second set of candidate transform types.

Example 5: The method of Example 1, wherein: the chroma transform type mode is the mode where a chroma coding block uses a transform type of a corresponding luma coding block for transformation; and determining the chroma transform type comprises determining an initial chroma transform type for the chroma residual block as the luma transform type, the method comprising: transforming the chroma residual block using a final chroma transform type; and generating the quantized chroma block comprises generating the quantized chroma block using the chroma residual block transformed by the final chroma transform type, wherein when the initial chroma transform type is a transform type other than the default transform type, the final chroma transform type is the initial chroma transform type or the default transform type, and quantized coefficients of the quantized chroma block depend upon quantized coefficients of the quantized luma block.

Example 6: The method of Example 5, comprising: responsive to the quantized luma block having no non-zero coefficients and the initial chroma transform type being the transform type that is other than the default transform type, setting all quantized coefficients in the quantized chroma block to zero before entropy encoding the quantized chroma block.

Example 7: The method of Example 1, wherein the luma transform type is a transform type that is other than the default transform type, the method comprising: transforming the chroma residual block using the default transform type to generate a first chroma transform block; transforming the chroma residual block using the luma transform type to generate a second chroma transform block; and selecting the first chroma transform block for generating the quantized luma block responsive to the quantized luma block having no non-zero coefficients, and otherwise, selecting the second chroma transform block for generating the quantized luma block.

Example 8: A method comprising receiving a bitstream including encoded coding blocks of a current image partitioned into multiple coding blocks; and for a coding block of the multiple coding blocks comprising a luma coding block and a chroma coding block, the luma coding block comprising luminance information of the coding block, and the chroma coding block comprising chrominance information of the coding block: entropy decoding a quantized luma block from the bitstream; generating a dequantized luma block by dequantizing the quantized luma block; generating a luma residual block by transforming the dequantized luma block using a luma transform type; generating a luma prediction block for the luma coding block; generating the luma coding block by adding the luma prediction block to the luma residual block; entropy decoding a quantized chroma block from the bitstream; generating a dequantized chroma block by dequantizing the quantized chroma block; decoding, from the bitstream, one or more bits identifying a chroma transform type mode, wherein the chroma transform type mode is one of an available plurality of chroma transform type modes that respectively define how to determine a chroma transform type for at least one chroma transform block, wherein the available plurality of chroma transform type modes comprises at least two of: a mode where a chroma coding block uses a default transform type; a mode where a chroma coding block uses a transform type of a corresponding luma coding block for decoding; a mode where a chroma coding block uses one of a set of candidate transform types, regardless of a transform type of a corresponding luma coding block; or a mode where a chroma coding block uses a transform type that depends on a prediction mode used for prediction of the chroma coding block; determining a chroma transform type for the dequantized chroma block based on the chroma type transform mode; generating a chroma residual block by transforming the dequantized chroma block using the chroma transform type; generating a chroma prediction block for the chroma coding block; generating the chroma coding block by adding the chroma prediction block to the chroma residual block; and reconstructing the coding block by combining the luma coding block and the chroma coding block.

Example 9: The method of Example 8, wherein the chroma transform type mode is the mode where a chroma coding block uses one of a set of candidate transform types, regardless of a transform type of a corresponding luma coding block, the method comprising: decoding, from the bitstream, an additional one or more bits identifying the chroma transform type for the chroma coding block.

Example 10: The method of Example 8, wherein: the chroma transform type mode is the mode where a chroma coding block uses a transform type of a corresponding luma coding block; the luma transform type comprises a transform type other than the default transform type; and all quantized coefficients of the quantized chroma block are zero.

Example 11: The method of Example 8, wherein: the chroma transform type mode is the mode where a chroma coding block uses a transform type of a corresponding luma coding block for decoding; the chroma coding block was encoded by: determining an initial chroma transform type for the chroma residual block as the luma transform type; transforming the chroma residual block using a final chroma transform type; and generating the quantized chroma block using the chroma residual block transformed by the final chroma transform type, wherein when the initial chroma transform type is a transform type other than the default transform type, the final chroma transform type is the initial chroma transform type or the default transform type, and quantized coefficients of the quantized chroma block depend upon quantized coefficients of the quantized luma block; and determining the chroma transform type for the dequantized chroma block comprises determining the chroma transform type as the luma transform type.

Example 12: The method of Example 11, wherein the chroma coding block was encoded by: responsive to the quantized luma block having no non-zero coefficients and the initial chroma transform type being the transform type that is other than the default transform type, setting all quantized coefficients in the quantized chroma block to zero before entropy encoding the quantized chroma block.

Example 13: The method of Example 8, wherein: the chroma transform type mode is the mode where a chroma coding block uses a transform type of a corresponding luma coding block for decoding; the luma transform type is a transform type that is other than the default transform type, and the chroma coding block was encoded by: transforming the chroma residual block using the default transform type to generate a first chroma transform block; transforming the chroma residual block using the luma transform type to generate a second chroma transform block; and selecting the first chroma transform block for generating the quantized luma block responsive to the quantized luma block having no non-zero coefficients, and otherwise, selecting the second chroma transform block for generating the quantized luma block.

Example 14: The method of Example 8, wherein: at least some luma residual blocks of the multiple coding blocks are partitioned for transformation by respective luma transform types; the chroma transform type mode is the mode where a chroma coding block uses a transform type of a corresponding luma coding block for decoding; and the luma transform type for each of the partitioned luma residual blocks that is located first in a coding order of the partitioned luma residual blocks is the default transform type.

Example 15: An apparatus comprising: a processor configured to perform the method according to any of Examples 1 to 14.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. An apparatus, comprising:
a processor configured to:
partition a current image to be encoded into multiple coding blocks; and
for a coding block of the multiple coding blocks of the current image:
generate a luma prediction block for a luma coding block comprising luminance information of the coding block;
generate a luma residual block as a difference between the luma coding block and the luma prediction block;
generate a quantized luma block after transforming the luma residual block using a luma transform type;
entropy encode the quantized luma block into a bitstream;
generate a chroma prediction block for a chroma coding block comprising chrominance information of the coding block;
generate a chroma residual block as a difference between the chroma coding block and the chroma prediction block;
determine an initial chroma transform type for the chroma residual block as the luma transform type;
generate a quantized chroma block using the chroma residual block transformed by a final chroma transform type, wherein when the initial chroma transform type is a transform type other than a default transform type, the final chroma transform type is the initial chroma transform type or the default transform type, and quantized coefficients of the quantized chroma block depend upon quantized coefficients of the quantized luma block; and
entropy encode the quantized chroma block into the bitstream.

2. The apparatus of claim 1, wherein the processor is configured to:
responsive to the quantized luma block having no non-zero coefficients and the initial chroma transform type being the transform type that is other than the default transform type, set all quantized coefficients in the quantized chroma block to zero before entropy encoding the quantized chroma block.

3. The apparatus of claim 1, wherein the processor is configured to:
transform the chroma residual block using the default transform type to generate a first chroma transform block;
transform the chroma residual block using the initial chroma transform type to generate a second chroma transform block; and
select the first chroma transform block for generating the quantized luma block responsive to the quantized luma block having no non-zero coefficients, and otherwise, selecting the second chroma transform block for generating the quantized luma block.

4. The apparatus of claim 1, wherein the luma transform type comprises the transform type that is other than the default transform type, and the processor is configured to:
before transforming the luma residual block, change the luma transform type to the default transform type.

5. The apparatus of claim 1, wherein the processor is configured to:
for an other coding block of the multiple coding blocks of the current image:
generate a luma prediction block for a luma coding block comprising luminance information of the coding block;
generate a luma residual block as a difference between the luma coding block and the luma prediction block;
generate a chroma prediction block for a chroma coding block comprising chrominance information of the coding block;
generate a chroma residual block as a difference between the chroma coding block and the chroma prediction block;
partition the luma residual block into a plurality of luma transform blocks;
determine a respective luma transform type for each of the plurality of luma transform blocks, including determining the luma transform type for a first luma transform block of the coding block in a coding order of the plurality of luma transform blocks is the default transform type where a transform type other than the default transform type would increase coding efficiency of the first luma transform block;
determine a chroma transform type as the luma transform type of the first luma transform block;
quantize each of the plurality of luma transform blocks after transformation to generate quantized luma transform blocks;
generate a quantized chroma block using the chroma residual block transformed by the chroma transform type;
entropy encode each of the quantized luma transform blocks into the bitstream; and
entropy encode the quantized chroma block into the bitstream.

6. The apparatus of claim 1, wherein the current image is a frame of a video sequence, and the processor is configured to, for an other frame of the video sequence:
partition the other frame into multiple coding blocks; and
for a coding block of the multiple coding blocks of the current image:
generate a luma prediction block for a luma coding block comprising luminance information of the coding block;
generate a luma residual block as a difference between the luma coding block and the luma prediction block;
generate a chroma prediction block for a chroma coding block comprising chrominance information of the coding block;

generate a chroma residual block as a difference between the chroma coding block and the chroma prediction block;
partition the luma residual block into a plurality of luma transform blocks;
determine a respective luma transform type for each of the plurality of luma transform blocks, including determining the luma transform type for a first luma transform block of the coding block in a coding order of the plurality of luma transform blocks is a transform type other than a default transform type;
before transforming the first luma transform block, change the luma transform type for the first luma transform block to the default transform type;
determine a chroma transform type as the luma transform type of the first luma transform block after changing the luma transform type;
quantize each of the plurality of luma transform blocks after transformation to generate quantized luma transform blocks;
generate a quantized chroma block using the chroma residual block transformed by the chroma transform type;
entropy encode each of the quantized luma transform blocks into the bitstream; and
entropy encode the quantized chroma block into the bitstream.

7. The apparatus of claim 1, wherein to determine the initial chroma transform type for the chroma residual block as the luma transform type corresponds to a chroma transform type mode of an available plurality of chroma transform type modes that respectively define how to determine the chroma transform type, the processor is configured to:
transmit one or more bits in the bitstream identifying the chroma transform type mode.

8. The apparatus of claim 1, wherein the current image is a frame of a video sequence, and the processor is configured to, for an other frame of the video sequence:
partition the other frame into multiple coding blocks, each coding block including a luma coding block comprising luminance information for the coding block and a chroma coding block comprising chrominance information for the coding block;
determine a chroma transform type for at least one chroma coding block according to a chroma transform type mode of an available plurality of chroma transform type modes that respectively define how to determine the chroma transform type,
wherein the plurality of chroma transform type modes comprises at least two of:
a mode where a chroma coding block uses the default transform type;
a mode where a chroma coding block uses a transform type of a corresponding luma coding block;
a mode where a chroma coding block uses one of a set of candidate transform types, regardless of a transform type of a corresponding luma coding block; or
a mode where a chroma coding block uses a transform type that depends on a prediction mode used for prediction of the chroma coding block; and
transmit one or more bits in the bitstream identifying the chroma transform type mode.

9. The apparatus of claim 8, wherein the chroma transform type mode is the mode where a chroma coding block uses one of a set of candidate transform types, and the processor is configured to:
transmit one or more bits in the bitstream identifying the chroma transform type within the set of candidate transform types.

10. An apparatus, comprising:
a processor configured to:
receive a bitstream including encoded coding blocks of a current image partitioned into multiple coding blocks, a coding block of the multiple coding blocks encoded by:
generating a luma prediction block for a luma coding block comprising luminance information of the coding block;
generating a luma residual block as a difference between the luma coding block and the luma prediction block;
generating a quantized luma block after transforming the luma residual block using a luma transform type;
entropy encoding the quantized luma block into a bitstream;
generating a chroma prediction block for a chroma coding block comprising chrominance information of the coding block;
generating a chroma residual block as a difference between the chroma coding block and the chroma prediction block;
determining an initial chroma transform type for the chroma residual block as the luma transform type;
generating a quantized chroma block using the chroma residual block transformed by a final chroma transform type, wherein when the initial chroma transform type is a transform type other than a default transform type, the final chroma transform type is the initial chroma transform type or the default transform type, and quantized coefficients of the quantized chroma block depend upon quantized coefficients of the quantized luma block; and
entropy encoding the quantized chroma block into the bitstream;
entropy decode the quantized luma block;
generate a dequantized luma block by dequantizing the quantized luma block;
generate the luma residual block by transforming the dequantized luma block using the luma transform type;
generate a luma prediction block for the luma coding block;
generate the luma coding block by adding the luma prediction block to the luma residual block;
entropy decode the quantized chroma block;
generate a dequantized chroma block by dequantizing the quantized chroma block;
determine a chroma transform type for the dequantized chroma block as the luma transform type;
generate the chroma residual block by transforming the dequantized chroma block using the chroma transform type;
generate a chroma prediction block for the chroma coding block;
generate the chroma coding block by adding the chroma prediction block to the chroma residual block; and
reconstruct the coding block by combining the luma coding block and the chroma coding block.

11. The apparatus of claim 10, wherein the processor is configured to:
decoding, from the bitstream, one or more bits identifying a chroma transform type mode, wherein the chroma transform type mode is one of an available plurality of chroma transform type modes that respectively define how to determine the chroma transform type for at least one chroma transform block.

12. The apparatus of claim 11, wherein the plurality of chroma transform type modes comprises at least two of:
- a mode where a chroma coding block uses the default transform type;
- a mode where a chroma coding block uses a transform type of a corresponding luma coding block for transformation;
- a mode where a chroma coding block uses one of a set of candidate transform types, regardless of a transform type of a corresponding luma coding block; or
- a mode where a chroma coding block uses a transform type that depends on a prediction mode used for prediction of the chroma coding block.

13. The apparatus of claim 11, wherein at least some of the multiple coding blocks of the current image were encoded using a chroma transform type mode where a chroma coding block uses one of a set of candidate transform types, regardless of a transform type of a corresponding luma coding block, and the processor is configured to:
- decode, from the bitstream, an additional one or more bits identifying the chroma transform type for an other chroma coding block of the current frame.

14. The apparatus of claim 10, wherein the luma transform type comprises the transform type other than the default transform type, and all quantized coefficients of the quantized chroma block are zero.

15. A method, comprising:
- receiving a bitstream including encoded coding blocks of a current image partitioned into multiple coding blocks, a coding block of the multiple coding blocks encoded by:
  - generating a luma prediction block for a luma coding block comprising luminance information of the coding block;
  - generating a luma residual block as a difference between the luma coding block and the luma prediction block;
  - generating a quantized luma block after transforming the luma residual block using a luma transform type;
  - entropy encoding the quantized luma block into a bitstream;
  - generating a chroma prediction block for a chroma coding block comprising chrominance information of the coding block;
  - generating a chroma residual block as a difference between the chroma coding block and the chroma prediction block;
  - determining an initial chroma transform type for the chroma residual block as the luma transform type;
  - generating a quantized chroma block using the chroma residual block transformed by a final chroma transform type, wherein when the initial chroma transform type is a transform type other than a default transform type, the final chroma transform type is the initial chroma transform type or the default transform type, and quantized coefficients of the quantized chroma block depend upon quantized coefficients of the quantized luma block; and
  - entropy encoding the quantized chroma block into the bitstream;
- entropy decoding the quantized luma block;
- generating a dequantized luma block by dequantizing the quantized luma block;
- generating the luma residual block by transforming the dequantized luma block using the luma transform type;
- generating a luma prediction block for the luma coding block;
- generating the luma coding block by adding the luma prediction block to the luma residual block;
- entropy decoding the quantized chroma block;
- generating a dequantized chroma block by dequantizing the quantized chroma block;
- determining a chroma transform type for the dequantized chroma block as the luma transform type;
- generating the chroma residual block by transforming the dequantized chroma block using the chroma transform type;
- generating a chroma prediction block for the chroma coding block;
- generating the chroma coding block by adding the chroma prediction block to the chroma residual block; and
- reconstructing the coding block by combining the luma coding block and the chroma coding block.

16. The method of claim 15, comprising:
- decoding, from the bitstream, one or more bits identifying a chroma transform type mode, wherein the chroma transform type mode is one of an available plurality of chroma transform type modes that respectively define how to determine the chroma transform type for at least one chroma transform block.

17. The method of claim 16, wherein the plurality of chroma transform type modes comprises at least two of:
- a mode where a chroma coding block uses the default transform type;
- a mode where a chroma coding block uses a transform type of a corresponding luma coding block for transformation;
- a mode where a chroma coding block uses one of a set of candidate transform types, regardless of a transform type of a corresponding luma coding block; or
- a mode where a chroma coding block uses a transform type that depends on a prediction mode used for prediction of the chroma coding block.

18. The method of claim 16, wherein at least some of the multiple coding blocks of the current image were encoded using a chroma transform type mode where a chroma coding block uses one of a set of candidate transform types, regardless of a transform type of a corresponding luma coding block, the method comprising:
- decoding, from the bitstream, an additional one or more bits identifying the chroma transform type for an other chroma coding block of the current frame.

19. The method of claim 15, wherein the luma transform type comprises the transform type other than the default transform type, and all quantized coefficients of the quantized chroma block are zero.

* * * * *